US009367906B2

(12) United States Patent
Jang et al.

(10) Patent No.: US 9,367,906 B2
(45) Date of Patent: *Jun. 14, 2016

(54) SYSTEM AND METHOD FOR COMPOSITING VARIOUS IMAGES USING CLUSTERING TECHNIQUE

(71) Applicant: Hyundai Mobis Co., Ltd, Seoul (KR)

(72) Inventors: Min Soo Jang, Yongin-si (KR); Ji Won Seo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 62 days.

This patent is subject to a terminal disclaimer.

(21) Appl. No.: 14/193,483

(22) Filed: Feb. 28, 2014

(65) Prior Publication Data

US 2015/0049950 A1    Feb. 19, 2015

(30) Foreign Application Priority Data

Aug. 19, 2013  (KR) ........................ 10-2013-0097556

(51) Int. Cl.
| G06T 5/50 | (2006.01) |
| G06K 9/46 | (2006.01) |
| G06T 11/00 | (2006.01) |
| G06T 5/00 | (2006.01) |
| G06T 7/00 | (2006.01) |
| G06K 9/20 | (2006.01) |

(52) U.S. Cl.
CPC ................ *G06T 5/50* (2013.01); *G06K 9/4661* (2013.01); *G06T 5/008* (2013.01); *G06T 7/0022* (2013.01); *G06T 11/00* (2013.01); *G06K 2009/2045* (2013.01); *G06T 2200/32* (2013.01); *G06T 2207/20221* (2013.01); *G06T 2207/30252* (2013.01)

(58) Field of Classification Search
None
See application file for complete search history.

(56) References Cited

U.S. PATENT DOCUMENTS

2014/0341467 A1* 11/2014 Seo ............................... 382/167

* cited by examiner

*Primary Examiner* — Bhavesh Mehta
*Assistant Examiner* — Menatoallah Youssef
(74) *Attorney, Agent, or Firm* — NSIP Law (57) ABSTRACT

Disclosed are a system and a method for compositing various images that minimize a brightness difference in connection areas of various images by using a clustering technique at the time of compositing various images. The method for compositing various images may include receiving two or more input images; compositing the two or more input images into one composite image; calculating a brightness distribution degree; calculating representative brightness values; determining clustering; calculating a correction target value; and calculating a correction value of an increase/decrease curve.

16 Claims, 7 Drawing Sheets

| NUMBER OF INPUT IMAGES HAVING ONE REPRESENTATIVE BRIGHTNESS VALUE | NUMBER OF INPUT IMAGES HAVING TWO REPRESENTATIVE BRIGHTNESS VALUES | CLUSTERING OR NOT AND CLUSTERING TYPE |
|---|---|---|
| 4 | – | NOT CLUSTERED |
| – | 4 | |
| 3 | 1 | BATCH CLUSTERING OR INDIVIDUAL CLUSTERING |
| 2 | 2 | |
| 1 | 3 | INDIVIDUAL CLUSTERING |

FIG. 7

SYSTEM AND METHOD FOR COMPOSITING VARIOUS IMAGES USING CLUSTERING TECHNIQUE

CROSS-REFERENCE TO RELATED APPLICATION

This application claims priority to and the benefit of Korean Patent Application No. 10-2013-0097556 filed in the Korean Intellectual Property Office on Aug. 19, 2013, the entire contents of which are incorporated herein by reference.

TECHNICAL FIELD

The present invention relates to a system and a method for compositing various images, and more particularly, to a system and a method for compositing various images using a clustering technique for minimizing a brightness difference in a connection area by using the clustering technique at the time of compositing various images acquired by a plurality of cameras into one image.

BACKGROUND OF THE INVENTION

Users who load a function of a black box or a rear camera on a vehicle for preventing an accident risk, convenience in parking, and the like increase.

As a result, in recent years, an around view monitor (AVM) system has been developed, in which as if a total of four cameras look down from the top of the vehicle by installing cameras at front and rear sides and left and right sides of the vehicle, four images are output to a display.

The AVM system is designed to so as for a user to conveniently observe surroundings through a monitor mounted on the front side of the vehicle by compositing images acquired from cameras installed at four sides of the vehicle.

However, in the conventional AVM system, the user cannot feel naturalness because a composite image is not smooth due to different brightness of photographed images of the respective cameras installed in the vehicle.

Since an image compositing and displaying method of an on-board camera proposed in Japanese Patent Laid-Open No. 2010-187161 calculates image brightness by an average value of all pixels that belong to an image, an error in a brightness average value or a gain occurs due to other objects or a shadow, and as a result, it is difficult to accurately correct brightness.

Japanese Patent Laid-Open No. 2010-187161 (Application date, Feb. 12, 2009)

SUMMARY OF THE INVENTION

The present invention has been made in an effort to provide a system and a method for compositing various images using a clustering technique that minimize a brightness difference in a connection area by using the clustering technique at the time of compositing images acquired by a plurality of cameras into one image.

The present invention has also been made in an effort to provide a system and a method for compositing various images using a clustering technique that create an environment that allows a user to further concentrate on driving without feeling a sense of difference.

An exemplary embodiment of the present invention provides a method for compositing various images using a clustering technique including: receiving two or more input images; compositing the two or more input images into one composite; calculating a brightness distribution degree of each input image in the composite image; calculating a representative brightness value of one or more increase/decrease curves (modal) in the brightness distribution degree; determining clustering of each input image or not and a clustering type of each input image through the representative brightness value and grouping the respective increase/decrease curves; calculating a correction target value of each group through the representative brightness values of the grouped increase/decrease curves; calculating a correction value of each increase/decrease curve by subtracting the representative brightness value of each increase/decrease curve of a corresponding group from the correction target value of each group; and correcting brightness by adding the correction value corresponding to the pixel value of each input image.

In the calculating of the brightness distribution degree of each input image, the brightness distribution degree may be calculated in all areas corresponding to the respective input images in the composite image or calculated in areas where the respective input images are adjacent to each other in the composite image.

A pattern of the brightness distribution degree may be simplified by lowering a quantization level to a level lower than 256 level (8 bits) which is a general brightness level.

In the calculating a representative brightness value of one or more increase/decrease curves, the increase/decrease curve may mean a curve having a parabolic pattern between minimums including at least one maximum and the representative brightness value may be calculated by any one of an average brightness value or a maximum value of pixels of each increase/decrease curve.

In the determining of the clustering of each input image or not and the clustering type of each input image and the grouping of the respective increase/decrease curves, a clustering technique of classifying the increase/decrease curves having a similar representative brightness values into the same group is used.

The clustering technique is divided into batch clustering of classifying increase/decrease curves of input images having two or more representative brightness values into the same group simultaneously and individual clustering of classifying increase/decrease curves of input images to groups to which increase/decrease curves having similar representative brightness values belong one by one.

The batch clustering classifies increase/decrease curves of input images having two or more representative brightness values into the same group simultaneously and is characterized in that an average of representative brightness values of input images having one representative brightness value is calculated and all increase/decrease curves of input images having one representative brightness value are batch-clustered at once to the same group as an increase/decrease curve having a representative brightness value of which an absolute value is smallest by comparing differences between representative brightness values of input images having one representative brightness value and representative brightness values of input image having two representative brightness values and the individual clustering clusters the increase/decrease curves by referring to an average of representative brightness values having two representative brightness values of input images or representative brightness values of which clustering is already completed.

In the calculating of the correction target value, the correction target value may be calculated by any one of an average value of the representative brightness values of the respective grouped increase/decrease curves, a representative value of an increase/decrease curve having a largest dimension, and a representative value of an increase/decrease curve having a largest maximum value.

In the calculating of the correction value, the correction value corresponding to each increase/decrease curve may be calculated as a value acquired by subtracting the representative brightness value of each increase/decrease curve from a correction target value of a group to which each increase/decrease curve belongs.

In the correcting of the brightness, the correction value of each increase/decrease curve may be multiplied by a weight value by a pixel value of the input image to calculate correction values respectively corresponding to the pixel values of the input images and the correction values respectively corresponding to the pixel values of the input images may be added to pixel values of the input images before correction to correct brightness.

According to a system and a method for compositing various images using a clustering technique, a brightness difference in connection areas of various images is minimized by using the clustering technique at the time of compositing various images, and as a result, a user can further concentrate on driving without feeling a sense of difference, thereby preventing an accident risk and providing convenience in parking.

DETAILED DESCRIPTION OF THE EMBODIMENTS

Hereinafter, a system and a method for compositing various images using a clustering technique according to exemplary embodiments of the present invention will be described in detail with reference to the accompanying drawings.

Figure 1:
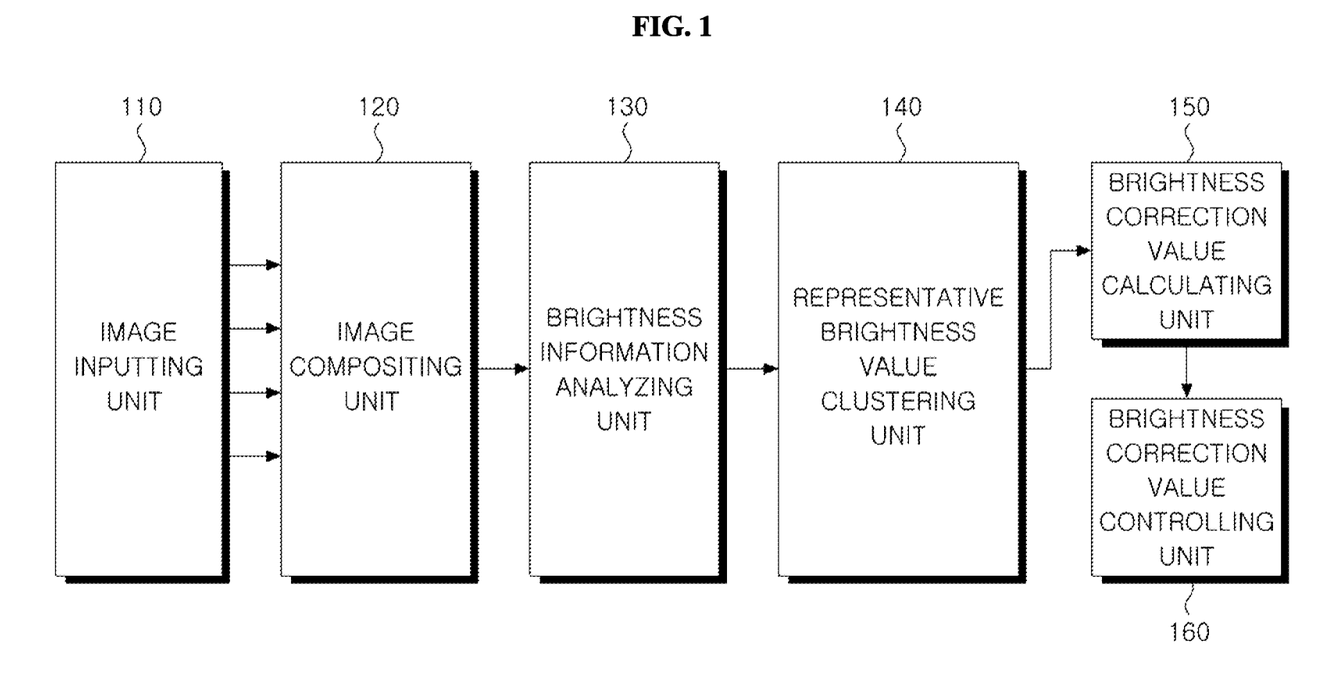
FIG. 1 is a schematic view of a system for compositing various images using a clustering technique according to an exemplary embodiment of the present invention.

As illustrated in FIG. 1, the system for compositing various images using a clustering technique according to the exemplary embodiment includes an image inputting unit 110, an image compositing unit 120, a brightness information analyzing unit 130, a representative brightness value clustering unit 140, a brightness correction value calculating unit 150, and a brightness correction value controlling unit 160.

The image inputting unit 110 receives various images acquired by photographing neighboring areas adjacent to a vehicle through cameras installed front, rear, left and right sides of the vehicle and the image compositing unit 120 composites various respective input images into one composite image.

Herein, since the camera is not limited to be installed in the vehicle and may be used in the system for compositing various images, the present invention may be applied regardless of a position or place where the camera is installed. Furthermore, the system includes a processor to operate a computer program to composite the various images as described with respect to FIG. 1.

The brightness information analyzing unit 130 calculates a brightness distribution degree in all areas corresponding to the respective input images in the composite image or in areas where the respective input images are adjacent to each other in the composite image.

After the brightness distribution degrees in all areas or the adjacent areas are calculated, a format of the brightness distribution degree is simplified by lowering a quantization level to a level lower than 256 level (8 bits) which is a general brightness level and representative brightness values of one or more increase/decrease curves (modal) in the brightness distribution degree are calculated.

The representative brightness value may be calculated by any one of an average brightness value or a maximum value of pixels of each increase/decrease curve.

Figure 3:
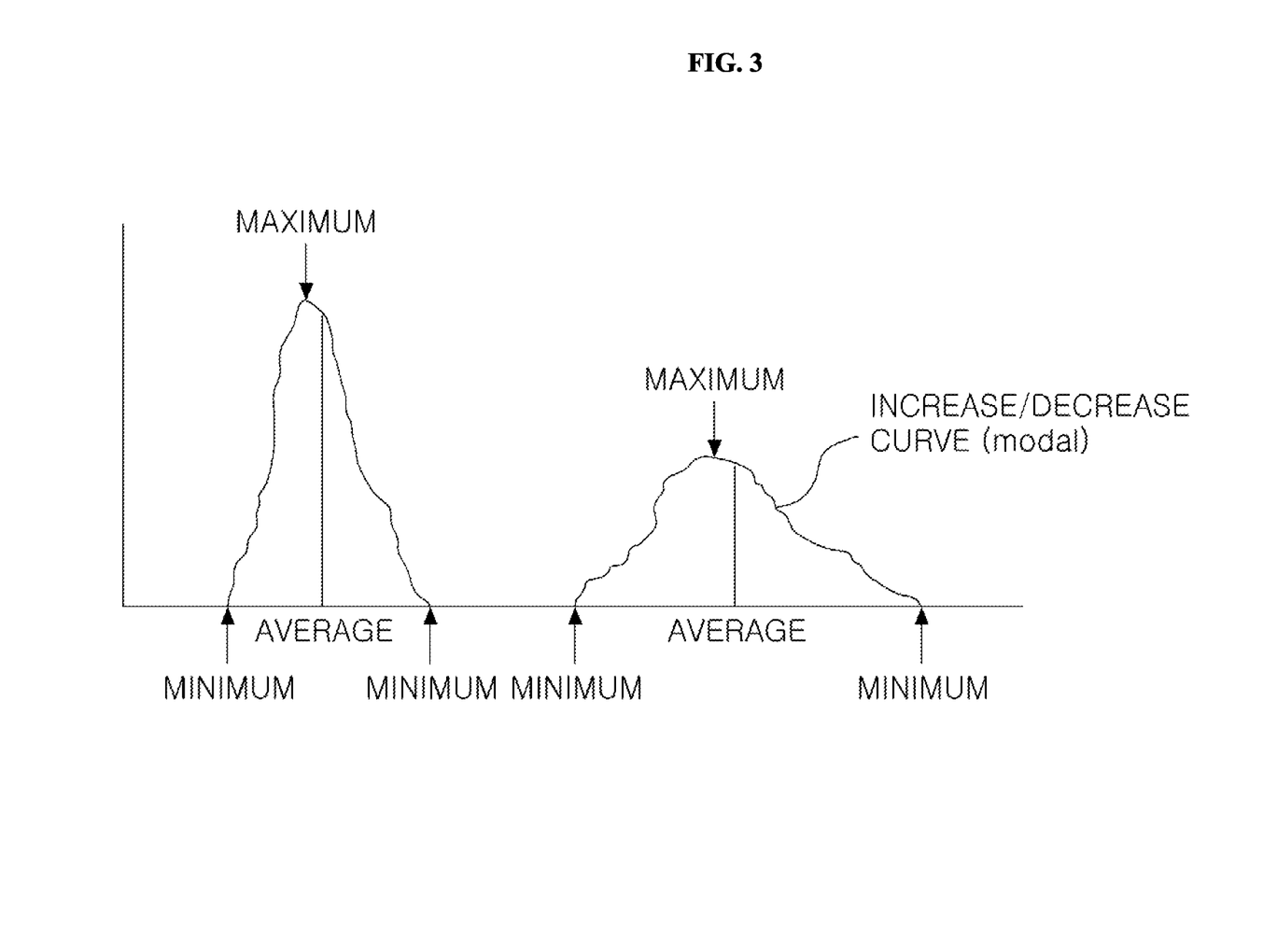
FIG. 3 is a schematic view illustrating an increase/decrease curve.

Herein, the increase/decrease curve (modal) has a parabolic pattern between minimums including at least one maximum as illustrated in FIG. 3.

The representative brightness value clustering unit 140 determines clustering of each input image or not and a clustering type of each input image through the representative brightness value and groups the respective increase/decrease curves.

The clustering technique may be a kind of classification operation of classifying increase/decrease curves having similar representative brightness values into the same group based on statistical similarity between objects constituting a data set, which is called cluster analysis.

The increase/decrease curves having similar representative brightness values are clustered into the same group and when the increase/decrease curves are not clustered, the increase/decrease curves immediately move to the brightness correction value calculating unit 150.

The brightness correction value calculating unit 150 calculates a correction target value by any one of an average value of the representative brightness values of the respective grouped increase/decrease curves, a representative value of an increase/decrease curve having a largest dimension, and a representative value of an increase/decrease curve having a largest maximum value, and a correction value corresponding to each increase/decrease curve by a value acquired by subtracting the representative brightness value of each increase/decrease curve from the correction target value of the group to which each increase/decrease curve belongs.

The brightness correction value controlling unit 160 multiplies the calculated correction value of each increase/decrease curve by a weight value by a pixel value of the input image to calculate correction values respectively corresponding to the pixel values of the input images and thereafter, and adds the correction values respectively corresponding to the pixel values of the input images to pixel values before correction, respectively to acquire a pixel value after correction.

Figure 2:
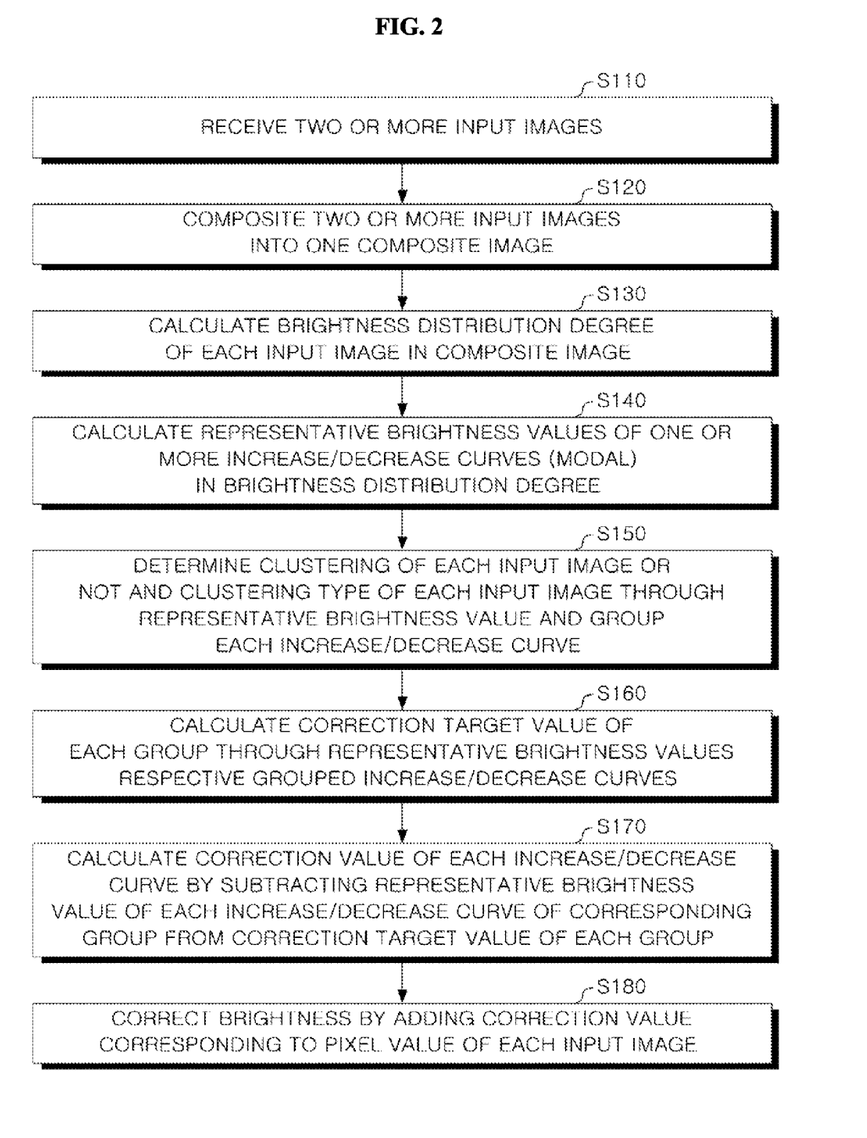
FIG. 2 is a flowchart illustrating a method for compositing various images using a clustering technique according to the present invention.

As illustrated in FIG. 2, a method for compositing various images using a clustering technique according to the exemplary embodiment may include: receiving two or more input images (S110); compositing the two or more input images into one composite image (S120); calculating a brightness distribution degree of each input image in the composite image (S130); calculating representative brightness values of one or more increase/decrease curves (modal) in the brightness distribution degree (S140); determining clustering of each input image or not and a clustering type of each input image through the representative brightness value and grouping the respective increase/decrease curves (S150); calculating a correction target value of each group through the representative brightness values of the grouped increase/decrease curves (S160); calculating a correction value of each increase/decrease curve by subtracting the representative brightness value of each increase/decrease curve of a corresponding group from the correction target value of each group (S170); and correcting brightness by adding the correction value corresponding to the pixel value of each input image (S180).

First, in the receiving of two or more input images (S110), various images may be input, which are acquired by photographing neighboring areas adjacent to a vehicle through cameras installed at front, rear, left, and right sides of the vehicle.

Next, in the compositing of two or more input images into one composite image (S120), the respective input images may be composited into one composite image.

Since surroundings are photographed by a wide-angle camera in order to put every side of the vehicle in a screen, a distortion phenomenon in which a border portion of an image is distorted by distortion of a camera lens having a short focus distance occurs, and as a result, the images are composited into one composite image and thereafter, correction and planarization of the distortion are basically performed on the images.

Next, in the calculating of the brightness distribution degree of each input image in the composite image (S130), the brightness distribution degree may be calculated in all areas corresponding to the respective input images in the composite image or calculated in areas where the respective input images are adjacent to each other in the composite image.

After the brightness distribution degrees are calculated in all areas or the adjacent areas, a pattern of the brightness distribution degree is simplified by lowering a quantization level to a level lower than 256 level (8 bits) which is a general brightness level.

Quantization means that a consecutive analog variation amount is divided into a finite number of levels which vary inconsecutively within a range of a predetermined width and a unique value is granted to each level.

Therefore, when the quantization level is lowered, the brightness distribution degree has a simple pattern.

Next, in the calculating of the representative brightness values of one or more increase/decrease curves (modal) in the brightness distribution degree (S140), the representative brightness value may be calculated as any one of an average brightness value or a maximum value of pixels of each increase/decrease curve.

Herein, the increase/decrease curve (modal) has a parabolic pattern between minimums including at least one maximum as illustrated in FIG. 3.

Therefore, it may be described that two increase/decrease curves are present in the brightness distribution degree of FIG. 3.

The representative brightness value of each increase/decrease curve may be calculated as the average brightness value of the pixels which belong to the increase/decrease curve by referring to the pattern of the brightness distribution degree in which the quantization level is lowered in the calculating of the brightness distribution degree.

The average brightness value of the pixels is calculated by a value acquired by multiplying x-axis values of the increase/decrease curve by y-axis values corresponding to the respective x-axis values, respectively and adding all of the values and dividing all of the added values by a value acquired by adding all of y-axis values corresponding to the x-axis values.

The representative brightness value of each increase/decrease curve may be calculated as a maximum value of each increase/decrease curve.

Next, in the determining of the clustering of each input image or not and the clustering type of each input image through the representative brightness value and the grouping of the respective increase/decrease curves (S150), the clustering technique is used.

The clustering technique may be a kind of classification operation of classifying increase/decrease curves having similar representative brightness values into the same group based on statistical similarity between objects constituting a data set, which is called cluster analysis.

The increase/decrease curves having similar representative brightness values are clustered into the same group and when the increase/decrease curves are not clustered, the increase/decrease curves immediately move to the calculating of the brightness correction value.

Figure 4:
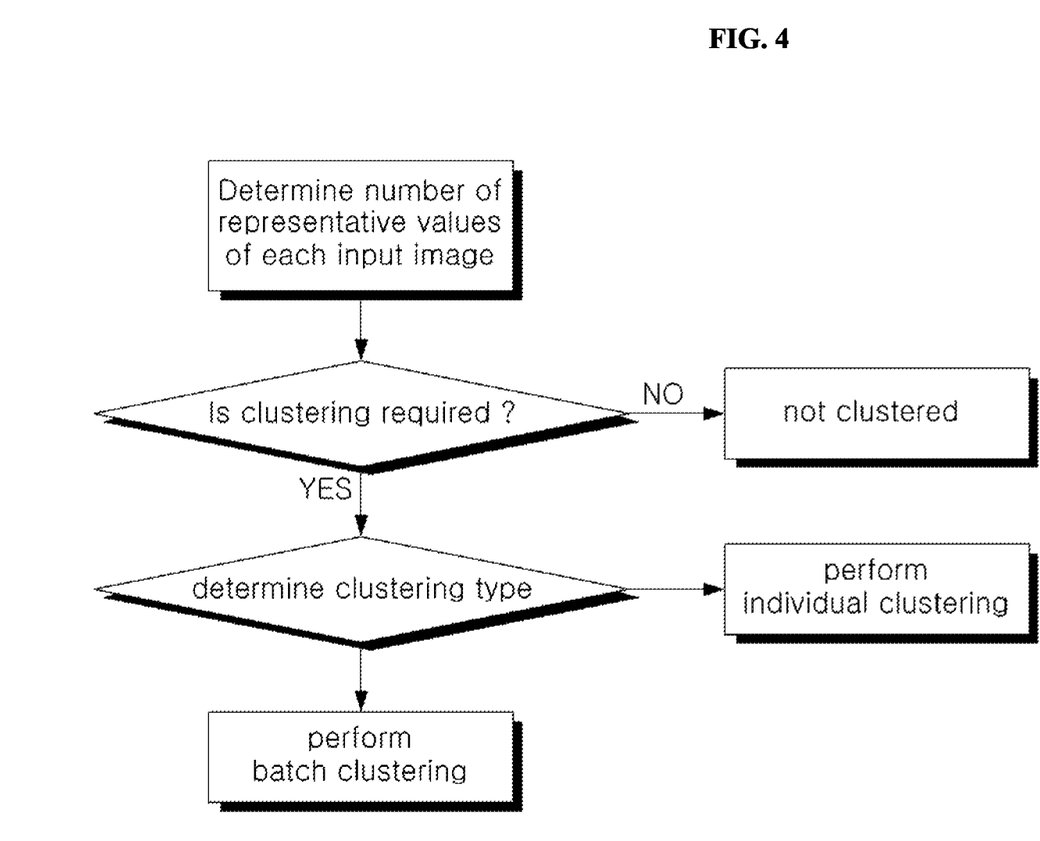
FIG. 4 is a flowchart for determining clustering or not and a clustering type.
Figure 5:
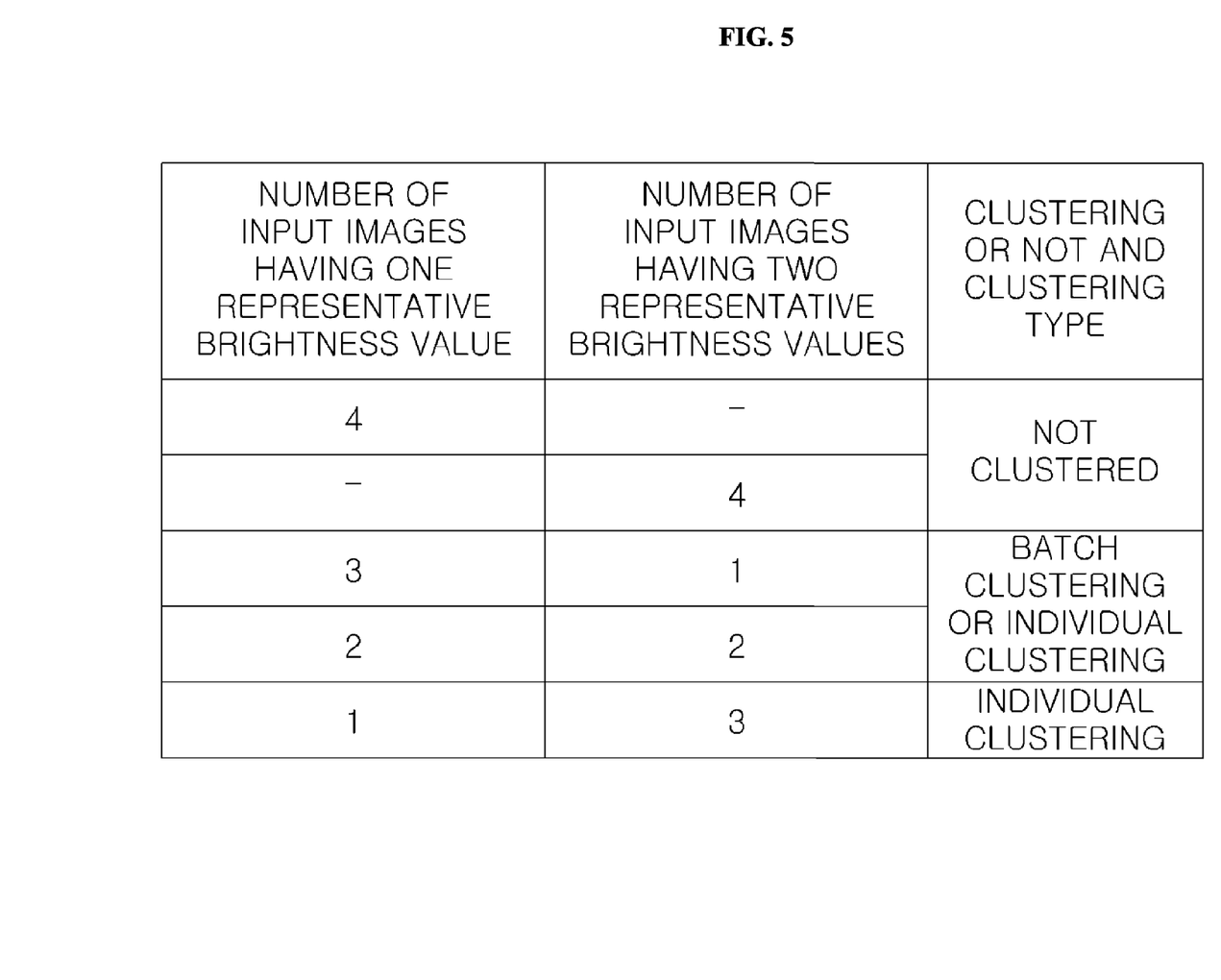
FIG. 5 is a schematic view for determining clustering or not and a clustering type depending on a representative brightness value and the number of input images.

As illustrated in FIGS. 4 and 5, the clustering or not and the clustering type are determined according to the number of input images having one brightness representative value and the number of input images having two brightness representative values.

Batch clustering classifies increase/decrease curves of input images having two or more representative brightness values into the same group simultaneously and is characterized in that an average of representative brightness values of input images having one representative brightness value is calculated and all increase/decrease curves of input images having one representative brightness value at once are batch-clustered to the same group as an increase/decrease curve having a representative brightness value of which an absolute value is smallest by comparing differences between representative brightness values of input image having one representative brightness value and representative brightness values of input image having two representative brightness values.

Individual clustering classifies the increase/decrease curves of the input images into groups which belong to increase/decrease curves having similar representative brightness values one by one, and since the individual clustering classifies the increase/decrease curves one by one unlike the batch clustering, the increase/decrease curves may be clustered by referring to an average of representative brightness values having two representative brightness values or representative brightness values of which clustering is already completed.

For example, it is assumed that input images 1, 2, 3, and 4 are created into the composite image and two increase/decrease curves of input image 1 having two representative brightness values are clustered to group 1 and group 2.

Herein, when an increase/decrease curve of input image 2 having one representative brightness value is clustered, the increase/decrease curve is individually clustered to a group in which a difference in absolute value between a representative brightness value of input image 2 and a representative brightness value of group 1 or a representative brightness value of group 2 is smallest.

Next, when an increase/decrease curve of input image 3 having one representative brightness value is clustered, the increase/decrease curve is individually clustered to a group in which a difference in absolute value between a representative brightness value of input image 3 and an average of the representative brightness value of group 1 or an average of the representative brightness value of group 2 is smallest.

Next, when an increase/decrease curve of input image 4 having one representative brightness value is clustered, the increase/decrease curve is individually clustered to a group in which a difference in absolute value between a representative brightness value of input image 4 and the average of the representative brightness value of group 1 or the average of the representative brightness value of group 2 is smallest.

In the case where four input images are input, when all of four input images have one representative brightness value or two representative brightness values, clustering is not performed.

Figure 6:
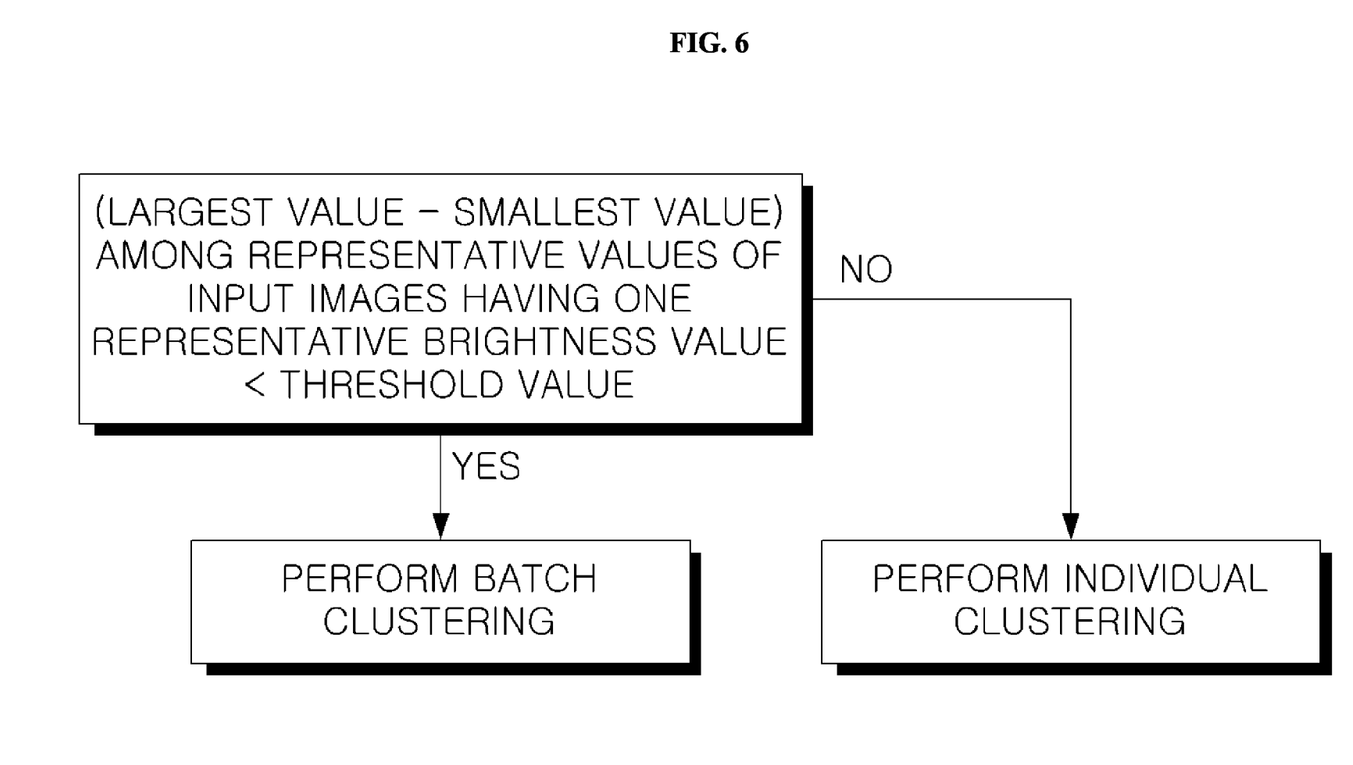
FIG. 6 is a flowchart for determining a clustering type when three input images having one representative brightness value and one input image having two representative brightness values are input.

In the case where three input images having one representative brightness value and one input image having two representative brightness values are input, when (a largest representative brightness value a smallest representative brightness value) among representative brightness values of input image having one representative brightness value is smaller than a threshold value as illustrated in FIG. 6, batch clustering is performed and when (the largest representative brightness value—the smallest representative brightness value) is larger than the threshold value, individual clustering is performed.

Figure 7:
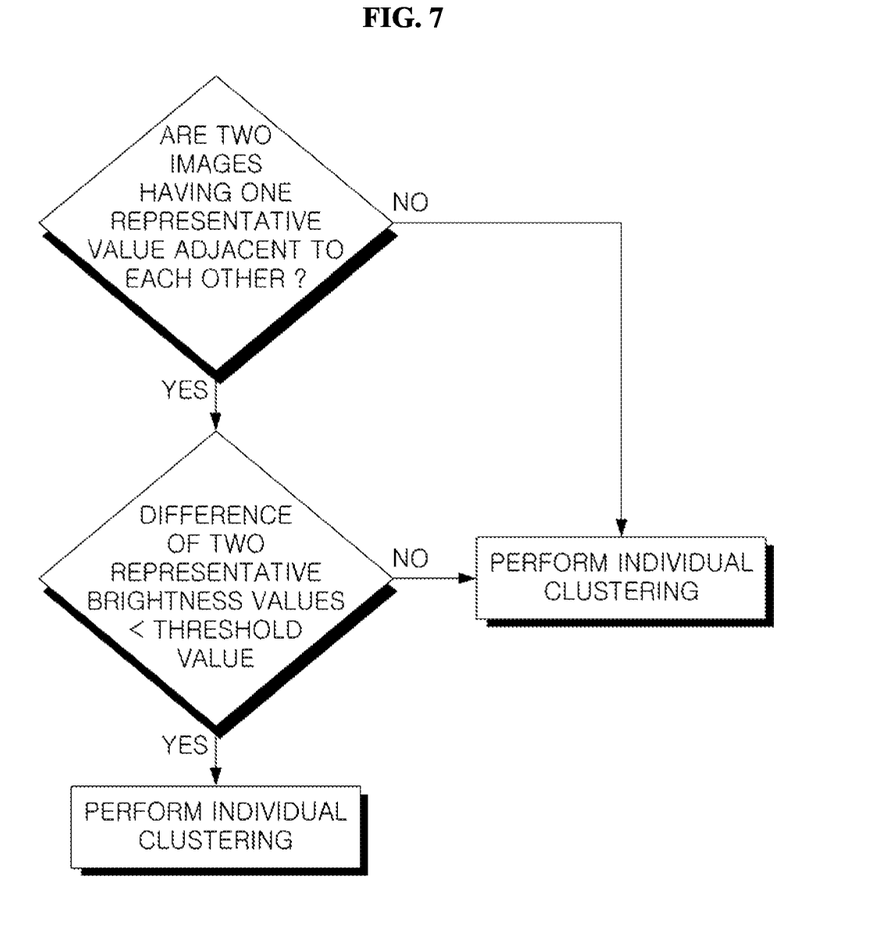
FIG. 7 is a flowchart for determining a clustering type when two input images having one representative brightness value and two input images having two representative brightness values are input.

In the case where two input images having one representative brightness value and two input images having two representative brightness values are input, when two input images having one representative brightness value is adjacent and (a representative brightness value of an image having the larger representative brightness value between two input images—a representative brightness value of an image having the smaller representative brightness value) is smaller than the threshold value as illustrated in FIG. 7, batch clustering is performed and when (the representative brightness value of the image having the larger representative brightness value between two images—the representative brightness value of the image having the smaller representative brightness value) is larger than the threshold value, individual clustering is performed.

When two input images having one representative brightness value are not adjacent to each other, individual clustering is performed.

When one input image having one representative brightness value and three input images having two representative brightness values are input, a clustering type is not separately determined and individual clustering is performed.

As such, the clustering technique may be changed according to the representative brightness value of the input image and the number of input images.

Next, in the calculating of the correction target value of each group through the representative brightness values of the respective grouped increase/decrease curves (S160), the correction target value may be calculated as any one of an average value of representative brightness values of the respective grouped increase/decrease curves, a representative value of an increase/decrease curve having a largest dimension, and a representative value of an increase/decrease having a largest maximum value.

A dimension when acquiring the representative value of the increase/decrease curve having the largest dimension is calculated by adding all of y-axis values corresponding to x-axis values of the increase/decrease curve.

Next, in the calculating of the correction value of each increase/decrease curve by subtracting the representative brightness value of each increase/decrease curve of the corresponding group from the correction target value of each group (S170), a correction value corresponding to each increase/decrease curve is calculated as a value acquired by subtracting the representative brightness value of each increase/decrease curve from a correction target value of a group to which each increase/decrease curve belongs.

Next, in the correcting of the brightness by adding a correction value corresponding to a pixel value of each input image (S180), the calculated correction value of each increase/decrease curve is multiplied by a weight value by a pixel value of an input image to calculate correction values corresponding to pixel values of input images.

The pixel value is acquired by expressing a brightness value of a pixel with numerals of 0 (black) to 255 (white).

Last, when the correction values corresponding to the pixel values of the input images are added to pixel values before correction, respectively, pixel values after correction may be acquired.

Various images are composited by using a more detailed clustering technique than in the related art through the aforementioned method to minimize a sense of difference for brightness of the connection areas of the input images.

As described above, although the method for compositing various images using the clustering technique of the present invention has been described with reference to the exemplary embodiments of the present invention, the scope of the present invention is not limited to the aforementioned exemplary embodiments and it is apparent to those skilled in the art that modifications, changes, and various modified examples can be made without departing from the spirit of the present invention.

What is claimed is:

1. A system of a vehicle for compositing various images, the system comprising:
   a processor operating a computer program to
   receive two or more input images;
   composite the two or more input images into one composite image;
   calculate a brightness distribution degree of each input image in the composite image and representative brightness values of one or more increase/decrease curves (modal) in the brightness distribution degree;
   determine at least one of a clustering of each input image, and a clustering type of each input image through the representative brightness value, and a grouping of respective increase/decrease curves;
   calculate a correction target value of each group through the representative brightness values of the grouped increase/decrease curves and subtracting the representative brightness value of each increase/decrease curve of a corresponding group from the correction target value of each group to calculate a correction value of each increase/decrease curve; and
   correct brightness by adding the correction value corresponding to the pixel value of each input image.

2. The system of claim 1, wherein the processor calculates a brightness distribution degree in all areas corresponding to the respective input images in the composite image or in areas where the respective input images are adjacent to each other in the composite image, and calculates the representative brightness value by any one of an average brightness value or a maximum value of pixels of each increase/decrease curve.

3. The system of claim 2, wherein the increase/decrease curve means a curve having a parabolic pattern between minimums and at least one maximum.

4. The system of claim 1, wherein the processor uses a clustering technique of classifying the increase/decrease curves having a similar representative brightness values into the same group.

5. The system of claim 1, wherein the processor calculates a correction target value by any one of an average value of the representative brightness values of the respective grouped increase/decrease curves, a representative value of an increase/decrease curve having a largest dimension, and a representative value of an increase/decrease curve having a largest maximum value.

6. The system of claim 1, wherein the processor multiplies the correction value of each increase/decrease curve by a weight value by a pixel value of the input image to calculate correction values respectively corresponding to the pixel values of the input images, and adds the correction values respectively corresponding to the pixel values of the input images to pixel values of the input images before correction to correct brightness.

7. A method for compositing various images using a clustering technique, the method comprising:
- receiving two or more input images;
- compositing the two or more input images into one composite image;
- calculating a brightness distribution degree of each input image in the composite image; calculating representative brightness values of one or more increase/decrease curves (modal) in the brightness distribution degree;
- determining at least one of a clustering of each input image, and a clustering type of each input image through the representative brightness value, and a grouping of respective increase/decrease curves;
- calculating a correction target value of each group through the representative brightness values of the grouped increase/decrease curves;
- calculating a correction value of each increase/decrease curve by subtracting the representative brightness value of each increase/decrease curve of a corresponding group from the correction target value of each group; and
- correcting brightness by adding the correction value corresponding to the pixel value of each input image.

8. The method of claim 7, wherein, in the calculating of the brightness distribution degree,
- the brightness distribution degree is calculated in any one of all areas corresponding to the respective input images in the composite image or in areas where the respective input images are adjacent to each other in the composite image.

9. The method of claim 7, wherein the representative brightness value is calculated by any one of an average brightness value or a maximum value of pixels of each increase/decrease curve.

10. The method of claim 7, wherein in the determining of the at least one of the clustering of each input image, the clustering type of each input image, and the grouping of the respective increase/decrease curves,
- a clustering technique of classifying the increase/decrease curves having a similar representative brightness values into the same group is used.

11. The method of claim 10, wherein the clustering technique is divided into batch clustering of classifying increase/decrease curves of input images having two or more representative brightness values into the same group simultaneously and individual clustering of classifying increase/decrease curves of input images to groups to which increase/decrease curves having similar representative brightness values belong one by one.

12. The method of claim 11, wherein the batch clustering classifies increase/decrease curves of input images having two or more representative brightness values into the same group simultaneously, and in the batch clustering, an average of representative brightness values of input images having one representative brightness value is calculated and all increase/decrease curves of input images having one representative brightness value are batch-clustered at once to the same group as an increase/decrease curve having a representative brightness value of which an absolute value is smallest by comparing differences between representative brightness values of input images having one representative brightness value and representative brightness values of input images having two representative brightness values.

13. The method of claim 11, wherein the individual clustering clusters the increase/decrease curves by referring to an average of representative brightness values having two representative brightness values of input images or representative brightness values of which clustering is already completed.

14. The method of claim 7, wherein, in the calculating of the correction target value,
- the correction target value is calculated by any one of an average value of the representative brightness values of the respective grouped increase/decrease curves, a representative value of an increase/decrease curve having a largest dimension, and a representative value of an increase/decrease curve having a largest maximum value.

15. The method of claim 7, wherein in the calculating of the correction value,
- the correction value corresponding to each increase/decrease curve is calculated as a value acquired by subtracting the representative brightness value of each increase/decrease curve from a correction target value of a group to which each increase/decrease curve belongs.

16. The method of claim 7, wherein in the correcting of the brightness,
- the correction value of each increase/decrease curve is multiplied by a weight value by a pixel value of the input image to calculate correction values respectively corresponding to the pixel values of the input images and the correction values respectively corresponding to the pixel values of the input images are added to pixel values of the input images before correction to correct brightness.

* * * * *